United States Patent
Kanematsu et al.

(10) Patent No.: US 8,276,435 B2
(45) Date of Patent: Oct. 2, 2012

(54) SURFACE TEXTURE MEASURING INSTRUMENT AND MEASURING METHOD

(75) Inventors: Toshihiro Kanematsu, Miyazaki (JP); Hideki Mishima, Miyazaki (JP); Nobuyuki Hama, Kure (JP)

(73) Assignee: Mitutoyo Corporation, Kawasaki-shi (JP)

( * ) Notice: Subject to any disclaimer, the term of this patent is extended or adjusted under 35 U.S.C. 154(b) by 607 days.

(21) Appl. No.: 12/510,401

(22) Filed: Jul. 28, 2009

(65) Prior Publication Data

US 2010/0018298 A1 Jan. 28, 2010

(30) Foreign Application Priority Data

Jul. 28, 2008 (JP) ................................ 2008-193884

(51) Int. Cl.
*G01B 5/20* (2006.01)
*G01B 5/28* (2006.01)
*G01B 21/30* (2006.01)
(52) U.S. Cl. ................. 73/104; 33/551; 33/568; 33/573
(58) Field of Classification Search .................... 73/104, 73/105; 33/504, 549, 551, 554, 555, 568, 33/569, 573, 645
See application file for complete search history.

(56) References Cited

U.S. PATENT DOCUMENTS

| 4,731,934 | A | 3/1988 | Barnaby et al. |
| 4,888,984 | A | 12/1989 | Marumo et al. |
| 5,253,429 | A | 10/1993 | Konno et al. |
| 6,745,616 | B1 | 6/2004 | Katayama et al. |
| 2003/0217592 | A1 | 11/2003 | Nagaike et al. |
| 2006/0196063 | A1 | 9/2006 | Sakata et al. |

FOREIGN PATENT DOCUMENTS

| JP | 2-249910 | * 10/1990 | ...................... 73/105 |
| JP | 08-029153 | 2/1996 | |

* cited by examiner

*Primary Examiner* — Daniel Larkin
(74) *Attorney, Agent, or Firm* — Rankin, Hill & Clark LLP

(57) ABSTRACT

A surface texture measuring instrument includes: a measuring device that includes a detector for detecting surface texture of a workpiece and an X-axis movement mechanism for moving the detector in a measurement direction; an elevation inclination adjuster capable of adjusting an elevation position and an inclination angle of a table on which the measuring device is mounted; a stage on which the workpiece is mounted; and a controller that controls the measuring device and the elevation inclination adjuster. The controller includes: a measurement controller that controls the X-axis movement mechanism to conduct a preliminary measurement and main measurement of the workpiece; a computing unit that acquires a result of the preliminary measurement from the detector and obtains an inclination angle of the workpiece at which the workpiece is inclined to the measurement direction; and a positioning controller for adjusting the inclination angle of the table based on the obtained inclination angle.

3 Claims, 10 Drawing Sheets

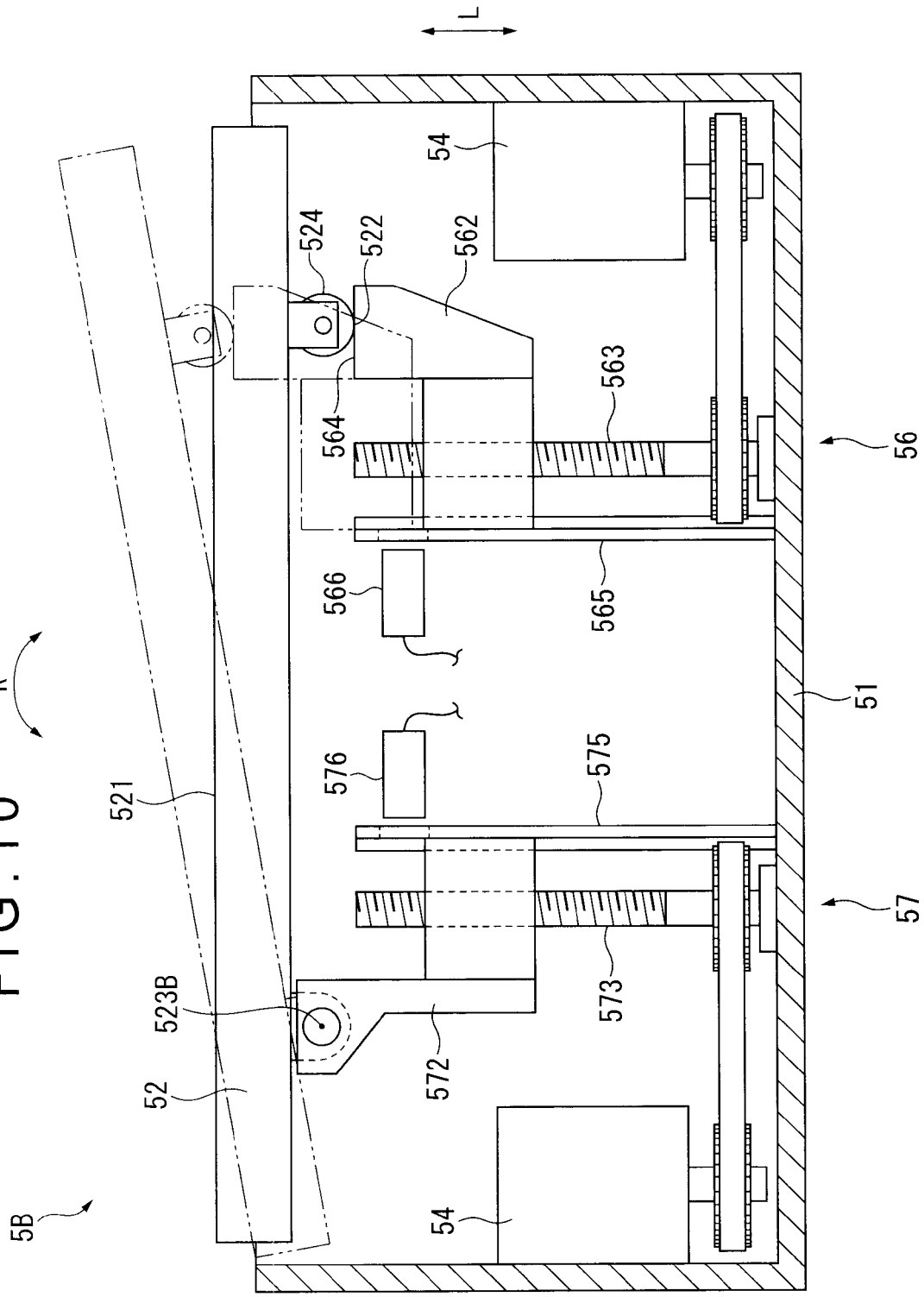

SURFACE TEXTURE MEASURING INSTRUMENT AND MEASURING METHOD

The entire disclosure of Japanese Patent Application No. 2008-193884, filed Jul. 28 2008, is expressly incorporated by reference herein.

BACKGROUND OF THE INVENTION

1. Field of the Invention

The present invention relates to a surface texture measuring instrument for conducting form measurements such as roughness measurements and contour measurements, and a method of the measurement.

2. Description of Related Art

To date, surface texture measuring instruments for conducting roughness measurements on workpieces having, for instance, cylindrical and conical edge lines are known (see, for instance, document 1: JP-A-8-29153).

The surface texture measuring instrument disclosed in Document 1, which includes a driving mechanism for moving the workpiece relatively with respect to a detector, conducts a provisional measurement before conducting a main measurement and totally automatically corrects a posture of the workpiece mounted on a table to the standard posture (i.e., a posture with which the main measurement is conducted) so as to conduct positioning of the workpiece. With the instrument, a measurement can be conducted in a short time. The positioning of the workpiece exemplarily includes adjustment (auto-setting) of an elevation position of the detector in the Z-axis direction (direction orthogonal to the measurement direction of the detector) and adjustment (auto-leveling) of an inclination angle of the workpiece for the measurement direction of the detector to be parallel to a measurement target surface of the workpiece.

However, in order for the surface texture measuring instrument disclosed in Document 1 to totally automatically conduct the positioning of the workpiece, the surface texture measuring instrument is required to use a combination of a table inclination device for inclining the table and an electric column device for moving the detector in Z-axis direction, which tends to result in a large-scale system configuration of the surface texture measuring instrument. Accordingly, a wider installation space may be required or device cost may be increased.

On the other hand, for conducing a roughness measurement on a relatively small workpiece, small-size portable surface texture measuring instruments have also been known. Such a small-size surface texture measuring instrument includes: a driving unit for measuring the workpiece by moving a detector along the surface of the workpiece; and an electric unit for controlling the driving unit and processing detection signals from the detector. Such a small-size surface texture measuring instrument typically checks leveling of the workpiece manually. Manual leveling check tends to consume longer time for adjustment, and repeatability in measurements of the same point may be deteriorated. Further, when both ends of a doughnut-shaped workpiece are measured, manual leveling may result in a damage to a stylus on the distal end of the detector if the stylus falls into the opening of the doughnut shape at the time of movement to the second measurement position. Thus, measurement of plurality of positions has not been necessarily easy. Accordingly, there has been an increasing demand for small-size surface texture instruments capable of automatically conducting a positioning.

SUMMARY OF THE INVENTION

An object of the invention is to provide a surface texture measuring instrument and a measuring method capable of conducting a positioning of a workpiece with a compact configuration and capable of enhancing operability of the positioning.

A surface texture measuring instrument according to an aspect of the invention includes: a measuring device that includes a detector that detects surface texture of a workpiece; and a movement mechanism that guides the detector movably in a measurement direction; an elevation inclination adjuster that includes a table on which either one of the workpiece and the measuring device is mounted, the elevation inclination adjuster being capable of adjusting an elevation position and an inclination angle of the table; a stage on which the other one of the workpiece and the measuring device is mounted; and a controller that controls the measuring device and the elevation inclination adjuster, in which the controller includes: a measurement controller that controls the movement mechanism to conduct a preliminary measurement and main measurement of the workpiece; a computing unit that acquires a result of the preliminary measurement from the detector and obtains an inclination angle of the workpiece at which the workpiece is inclined to the measurement direction; and a positioning controller that controls the elevation inclination adjuster to adjust the elevation position of the table and adjust the inclination angle of the table based on the inclination angle obtained by the computing unit.

According to the above configuration, since the elevation inclination adjuster capable of adjusting the elevation position and the inclination angle of the table is included, the elevation movement and the inclination movement of the workpiece or the measuring device can be performed by a single device when a preliminary measurement and a main measurement are conducted. Thus, the positioning of the workpiece can be performed with a compact configuration. Further, merely by controlling the elevation inclination adjuster, the positioning controller can perform the positioning of the workpiece based on the inclination angle obtained by the computing unit. Thus, automation of the positioning can be facilitated and operability of the positioning can be enhanced.

The surface texture measuring instrument according to the aspect of the invention preferably further includes: an external device worked in conjunction with the measuring device; and an external controller that controls the external device and performs inputting and outputting of control signals between the controller and the external controller.

According to the above configuration, since the surface texture measuring instrument includes the external device such as a workpiece feeder and performs the inputting and outputting of the control signals such as measurement start/stop signals and status signals between the external controller and the controller, construction of an automatic inspection system can be facilitated. Examples of such a system include: a system for remotely administering operations of the surface texture measurement through the external controller; and a system for automatically performing a sorting of products (i.e., workpiece) into non-defective products and defective products and assortment thereof by making a pass-fail decision based on the measurement result through the external controller. Construction of such systems can be facilitated. In other words, a step for measuring surface texture can be easily incorporated into a manufacturing line and an inspection line.

A method of measuring according to another aspect of the invention uses a surface texture measuring instrument that includes: a measuring device that includes: a detector that detects the surface texture of the workpiece; and a movement mechanism that guides the detector movably in a measurement direction; an elevation inclination adjuster that includes a table on which either one of the workpiece and the measuring device is mounted, the elevation inclination adjuster being capable of adjusting an elevation position and an inclination angle of the table; a stage on which the other one of the workpiece and the measuring device is mounted; and a controller that controls the measuring device and the elevation inclination adjuster. The method includes: first auto-setting in which the table is elevated to a position where the detector is capable of detecting the workpiece; preliminary measuring in which the detector is moved in the measurement direction to scan the workpiece; automatically escaping in which the detector is automatically escaped from the workpiece by elevation of the table; automatically inclining in which the inclination angle of the table is adjusted based on an inclination angle of the workpiece obtained from a result of the preliminary measuring, the inclination angle of the workpiece being an angle at which the workpiece is inclined to the measurement direction; second auto-setting in which the table is elevated to a position where the detector is capable of detecting the workpiece; and main measuring in which the detector is moved in the measurement direction to scan the workpiece.

According to the aspect of the invention, since the method of measuring a workpiece includes the first auto-setting, the preliminary measuring, the automatic escaping, the automatic inclining, the second auto-setting and the main measuring, automatic measurement can be realized, and the same advantages that the above surface texture measuring instrument provides can be obtained.

BRIEF DESCRIPTION OF THE DRAWINGS

FIG. 10 is a lateral view schematically showing a driving mechanism for an elevation inclination adjuster according to a third exemplary embodiment of the invention.

DETAILED DESCRIPTION OF PREFERRED EMBODIMENT(S)

Exemplary embodiment(s) of the invention will be described below with reference to the attached drawings.

In the description of a second exemplary embodiment and thereafter below, the same components and components for the same functions as in the below-described first exemplary embodiment will be denoted by the same numerals, and the description therefor will be simplified or omitted.

[First Exemplary Embodiment]

Figure 1:
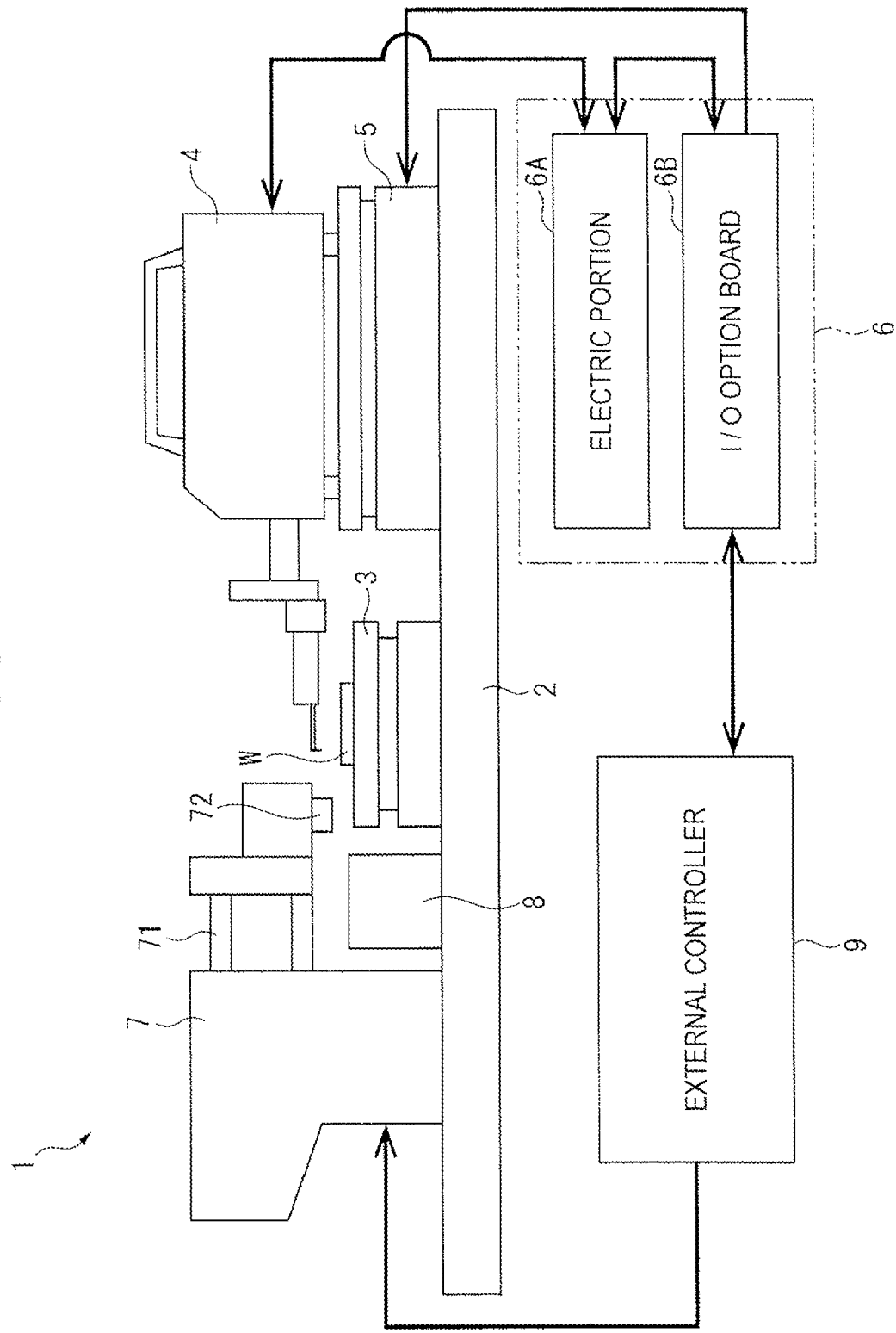
FIG. 1 shows the entire structure of a surface texture measuring instrument according to a first exemplary embodiment of the invention.
Figure 2:
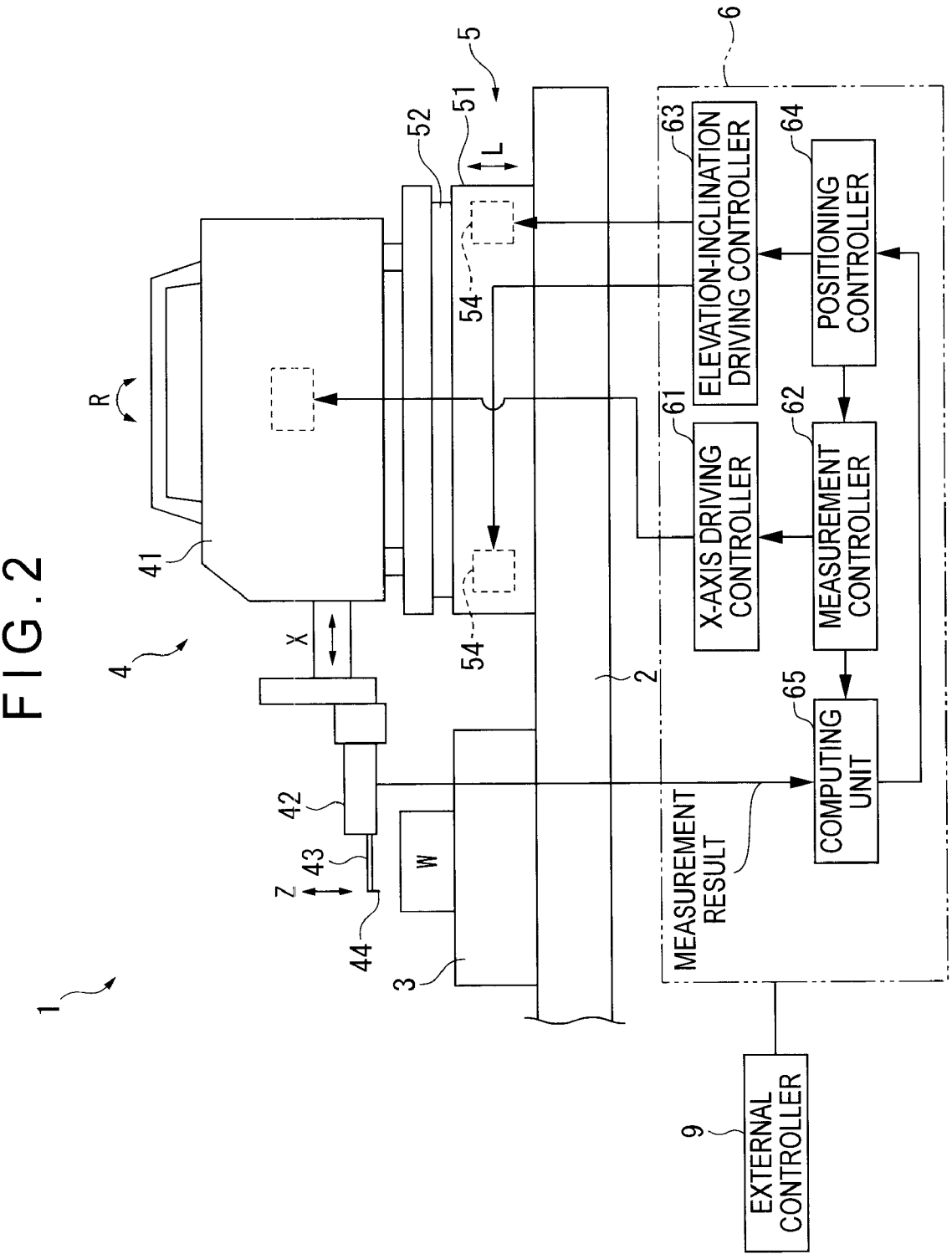
FIG. 2 is a block diagram for explaining a structure of a controller for the surface texture measuring instrument.

FIG. 1 shows the entire structure of a surface texture measuring instrument 1 according to the first exemplary embodiment. FIG. 2 is a block diagram for explaining a structure of a controller for the surface texture measuring instrument 1.

In FIG. 1, the surface texture measuring instrument 1, which is for conducting form measurements on a workpiece W such as roughness measurements and contour measurements, includes: a platform 2; a stage 3 on which the workpiece W is placed; a measuring device 4; an elevation inclination adjuster 5 (auto-setting/auto-leveling table) on which the measuring device 4 is placed; and a controller 6 for automatically conducting a positioning of the measuring device 4 relative to the workpiece W. The measuring device 4 is movable by the elevation inclination adjuster 5.

In addition to the stage 3 and the elevation inclination adjuster 5, a workpiece feeder 7 (external device worked in conjunction with the measuring device 4) and a parts box 8 are placed on the platform 2. An external controller 9 for controlling the workpiece feeder 7 is provided by PLC and a control box, and connected with the controller 6.

The workpiece feeder 7 includes an arm 71 extendable between the stage 3 and the parts box 8. A head 72 attached on the distal end of the arm 71 is capable of placing a workpiece W accommodated in the parts box 8 onto the stage 3.

The controller 6 is fed with measurement start/stop signals from the external controller 9 while the external controller 9 is fed with status signals from the controller 6 such as ready signals, OK/NG signals, measurement error signals and abnormal signals of the measuring device 4.

The controller 6 includes an electric portion 6A and an I/O option board 6B (external control I/O), and the signals from the external controller 9 are transmitted to the electric portion 6A via the I/O option board 6B.

As shown in FIG. 2, the measuring device 4 includes: an X-axis movement mechanism 41 placed on the elevation inclination adjuster 5; and a detector 42 mounted on the X-axis movement mechanism 41 in a manner movable in an X-axis direction. The X-axis direction is coincident with a measurement direction of the detector 42.

The detector 42, which includes: a measurement arm 43 extended in the X-axis direction; and a stylus 44 (contact piece) mounted on the distal end of the measuring arm 43, is capable of detecting a displacement amount by which the stylus 44 is displaced in a Z-axis direction when the stylus 44 contacts the workpiece W. The Z-axis direction is a direction orthogonal to the X-axis direction (i.e., measurement direction).

As described above, the measuring device 4 moves the measurement arm 43 in the X-axis direction while maintaining the contact of the stylus 44 on the workpiece W, so that the stylus 44 is displaced in the Z-axis direction in a manner following the irregularities of the surface contour of the workpiece W. By detecting the oscillation amount of the stylus 44 at this time, the measuring device 4 is capable of measuring the contour and surface roughness of the workpiece W based on the detected oscillation amount.

The elevation inclination adjuster 5, of which detailed description will be made later, includes: a base 51 mounted on the platform 2; a table 52 movably supported on the base 51; a moving unit (not shown) for moving the table 52; and a pair of driving sources 54 for driving the moving unit. The elevation inclination adjuster 5 is for elevating the measuring device 4 mounted on the table 52 along an L-axis direction as well as for swinging the measuring device 4 around an R axis. The L-axis direction may be exemplarily the vertical direction. The R axis is an axis orthogonal to a plane within which the X axis and the Z axis related to the measuring device 4 extend. In this exemplary embodiment, to swing the measuring device 4 around the R axis means to incline the measuring device 4 to the horizontal plane.

In FIG. 2, the controller 6, which includes an X-axis driving controller 61, a measurement controller 62, an elevation-inclination driving controller 63, a positioning controller 64 and a computing unit 65, is exemplarily provided by a micro computer, a data processor and various programs built in these equipments.

The X-axis driving controller 61 controls the X-axis movement mechanism 41 to be driven when preliminary measurements and main measurements are conducted on the workpiece W with use of the measuring device 4. The measurement controller 62 transmits control signals to the X-axis driving controller 61. The elevation-inclination driving controller 63 controls the pair of driving sources 54 of the elevation inclination adjuster 5 to be driven when the positioning is performed with use of the elevation inclination adjuster 5. The positioning controller 64 transmits control signals to the elevation-inclination driving controller 63 and transmits positioning-completion signals to the measurement controller 62. The computing unit 65 acquires results of preliminary measurements from the detector 42 upon receipt of measurement implementation signals from the measurement controller 62, and computes an error of the posture of the workpiece W with respect to the standard posture (i.e., posture when main measurements are conducted). The computing unit 65 transmits signals corresponding to the computed results to the positioning controller 64, and acquires results of main measurements from the detector 42 for analysis processing.

Figure 3:
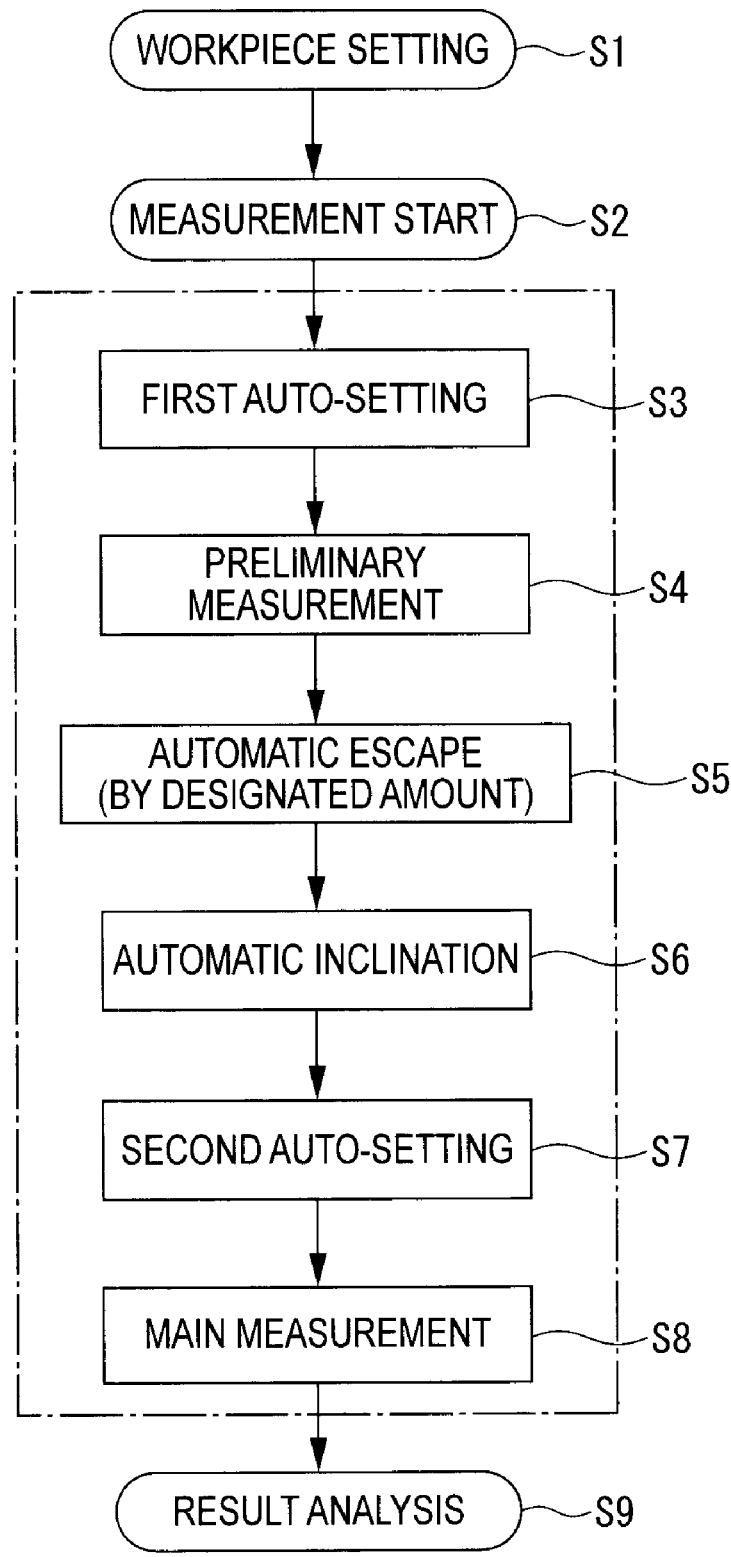
FIG. 3 is a flow diagram for explaining measuring steps of the surface texture measuring instrument.

FIG. 3 is a flow diagram for explaining the steps for measuring the surface texture of the workpiece W.

First of all, the workpiece W is placed on the stage 3 (workpiece setting step: S1), and a measurement is initiated (S2).

Then, the detector 42 of the measuring device 4 is vertically moved (auto-set) to a position where the detector 42 can detect the workpiece W, and brought closer to the workpiece W (first auto-setting step: S3). In this step, by operating the elevation inclination adjuster 5 with the positioning controller 64 (FIG. 2), the measuring device 4 is lowered down. Subsequently, the measuring device 4 preliminarily measures the workpiece W (preliminary measurement step: S4). In this step, with the measurement controller 62 (FIG. 2), the detector 42 is moved in the X-axis direction to scan the surface of a measurement target portion of the workpiece W, and controlled to output the measurement result to the computing unit 65 (FIG. 2). After the preliminary measurement step S4, the measuring device 4 is automatically moved therefrom by a designated amount (automatic escape step: S5). In this step, the positioning controller 64 operates the elevation inclination adjuster 5 to lift up the measuring device 4 by a designated amount, in order to prevent the detector 42 from interfering with the workpiece W when the measuring device 4 is inclined in the later-described automatic inclination step S6.

Next, the computing unit 65 computes an error of the posture of the workpiece W with respect to the standard posture based on a measurement result of the preliminary measurement. For instance, based on a profile curve of the measurement target portion measured in the preliminary measurement, an inclination angle at which the surface of the measurement target portion is inclined to the measurement direction (X-axis direction) of the detector 42 is obtained. Based on a result of the computation by the computing unit 65, the positioning controller 64 operates the elevation inclination adjuster 5 to incline the measuring device 4 so that the measurement direction of the measuring device 42 becomes parallel to the surface of the measurement target portion (automatic inclination step: S6). Then, for the sake of a main measurement, the measuring device 4 is lowered down (second auto-setting step: S7) and the main measurement is conducted (main measurement step: S8). As in the preliminary measurement step S4, in the main measurement step S8, with the measurement controller 62, the detector 42 is moved in the X-axis direction to measure the surface texture of the measurement target portion of the workpiece W, and controlled to output the measurement result to the computing unit 65. The outputted measurement result is suitably analyzed (result analyzing step: S9).

In the above-described manner, after the initiation of the measurement S2, the series of operations from the first auto-setting step S3 to the main measurement step S8 can be conducted fully automatically.

As shown in FIG. 1, the surface texture measuring instrument 1 capable of the above-described fully automatic measurement includes the workpiece feeder 7 and the external controller 9, thereby providing an automatic inspection system. In other words, a user can externally control the surface texture measuring instrument 1, and easily make a pass-fail decision based on the measurement result. For instance, a user can easily construct such a system that automatically performs a sorting of products (i.e., workpiece) into non-defective products and defective products and assortment thereof.

As in the above, by connecting the controller 6 with the external controller 9 via the I/O option board 6B, the surface texture measuring instrument 1 can be easily incorporated into a manufacturing line or an inspection line.

The structure of the surface texture measuring instrument 1 is not limited to such a measuring-device movable structure as shown in FIG. 1. For instance, the surface texture measuring instrument 1 may be structured such that the workpiece W is placed on the elevation inclination adjuster 5 while the measuring device 4 is placed on the stage 3. In other words, a workpiece movable structure may be adopted. In this structure, the controller 6 automatically performs a positioning of the workpiece W relative to the measuring device 4.

The elevation inclination adjuster 5, which is indispensably required for realizing the above-described surface texture measuring instrument 1, will be described in detail with reference to the drawings.

Figure 4:
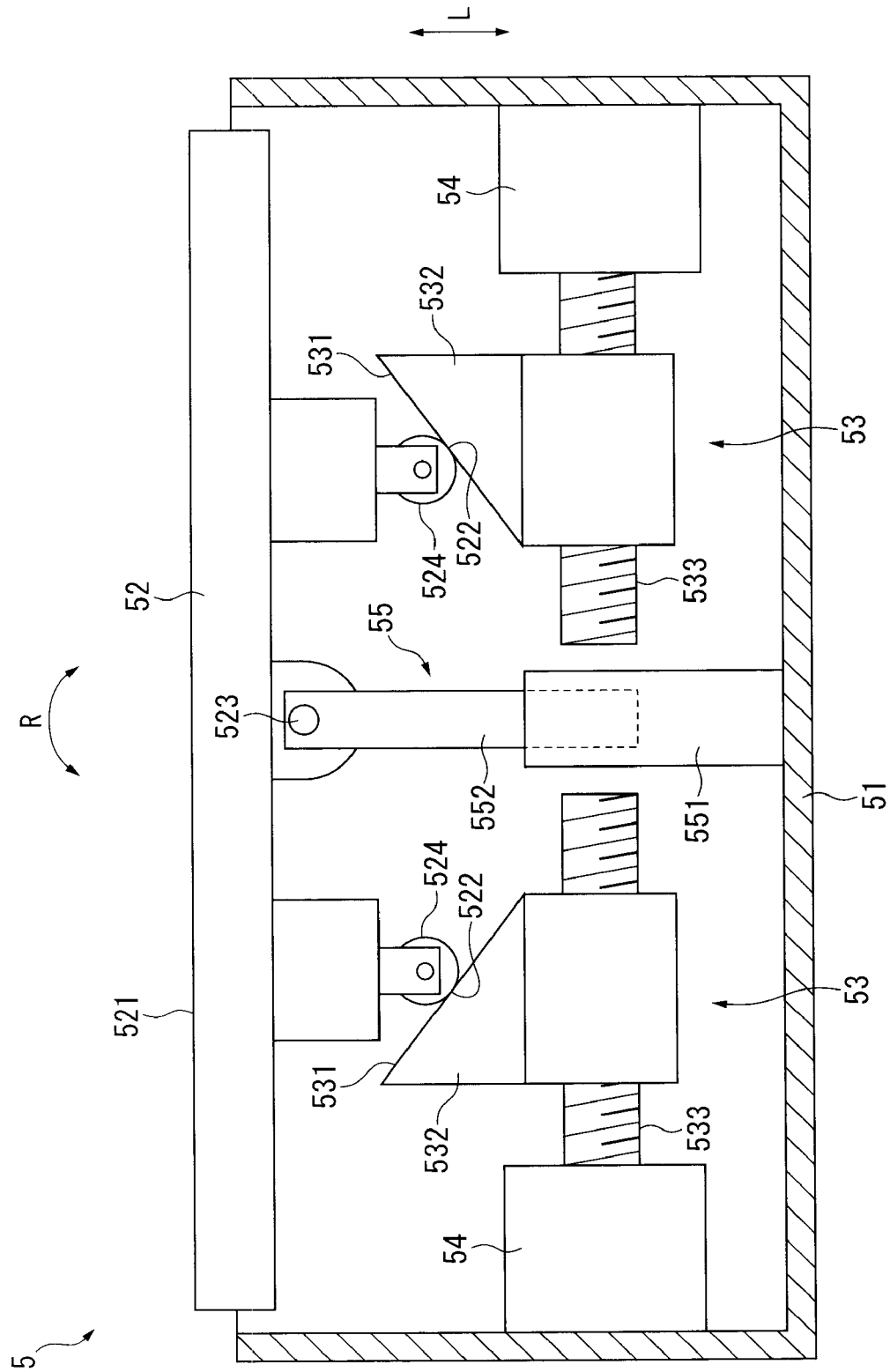
FIG. 4 is a lateral view schematically showing a driving mechanism for an elevation inclination adjuster of the surface texture measuring instrument.

FIG. 4 is a lateral view schematically showing a driving mechanism for the elevation inclination adjuster 5.

The elevation inclination adjuster 5 includes: the base 51; the table 52 provided in such a manner that a distance between the base 51 and the table 52 is changeable; a pair of moving units 53 provided to the base 51 for supporting the table 52 while allowing the table 52 to be elevated; the driving sources 54 (motor) for driving the pair of moving units 53; and a fulcrum guide 55 provided between the pair of moving units 53.

The table 52 has: a placement surface 521; points of action 522 provided at two positions along a direction parallel to the placement surface 521; and a fulcrum 523 provided between the two points of action 522 in the direction parallel to the placement surface 521. The fulcrum 523 is provided on the center axis of the table 52.

The moving units, 53, which support the points of action 522 of the table 52, are capable of moving the points of action 522 in a direction in which the distance between the points of action 522 and the base 51 is increased or decreased (i.e., distance increasing/decreasing direction).

Specifically, each moving unit 53 includes: a slider 532 having a slanted surface 531; and a lead screw 533 (slider moving member) screwed to the slider 532. The lead screw 533 is provided along a direction orthogonal to a direction in which the placement surface 521 is parallely moved (parallel movement direction), and rotatably supported by the base 51. The lead screw 533 is connected to the driving source 54 and rotated by a rotation driving force of the driving source 54 so as to move the slider 532 in the direction orthogonal to the parallel movement direction of the placement surface 521.

The table 52 also rotatably supports rollers 524 (point-of-action members) that are in contact with the slanted surfaces 531. The slanted surfaces 531 and contact portions of the rollers 524 provide the points of action 522, so that the points of action 522 are moved along the slanted surfaces 531 when the sliders 532 are moved.

As described above, the pair of moving units 53 are designed to move the points of action 522, which are provided at two positions with the center axis of the table 52 interposed therebetween, in the vertical direction by motor driving.

While this exemplary embodiment uses the rollers 524 rotatably supported on the table 52 as the point-of-action members, the point-of-action members may be any members other than rollers, as long as such members are capable of rolling or sliding on the slanted surfaces.

The fulcrum guide 55 includes: a guide 551 provided to the base 51; and an arm 552 linearly guided by the guide 551 along the parallel movement direction of the placement surface 521, i.e., in the L-axis direction (in this exemplary embodiment, vertical direction). The upper end of the arm 552 is supported on the fulcrum 523 of the table 52.

The fulcrum guide 55 linearly guides the fulcrum 523 (inclination rotation center) along the L-axis direction and the fulcrum 523 does not move in the horizontal direction. Thus, the accuracy when the inclination angle of the table 52 is adjusted based on the fulcrum 523 is increased. The elevation position of the table 52 needs to be determined by the support positions of the rollers 524 provided at the two positions. Thus, the movement of the fulcrum 523 in the elevation direction cannot be restrained. However, with use of the fulcrum guide 55 of this exemplary embodiment, the fulcrum 523 can be linearly guided without restraining the movement of the fulcrum 523 in the elevation direction.

Figure 5:
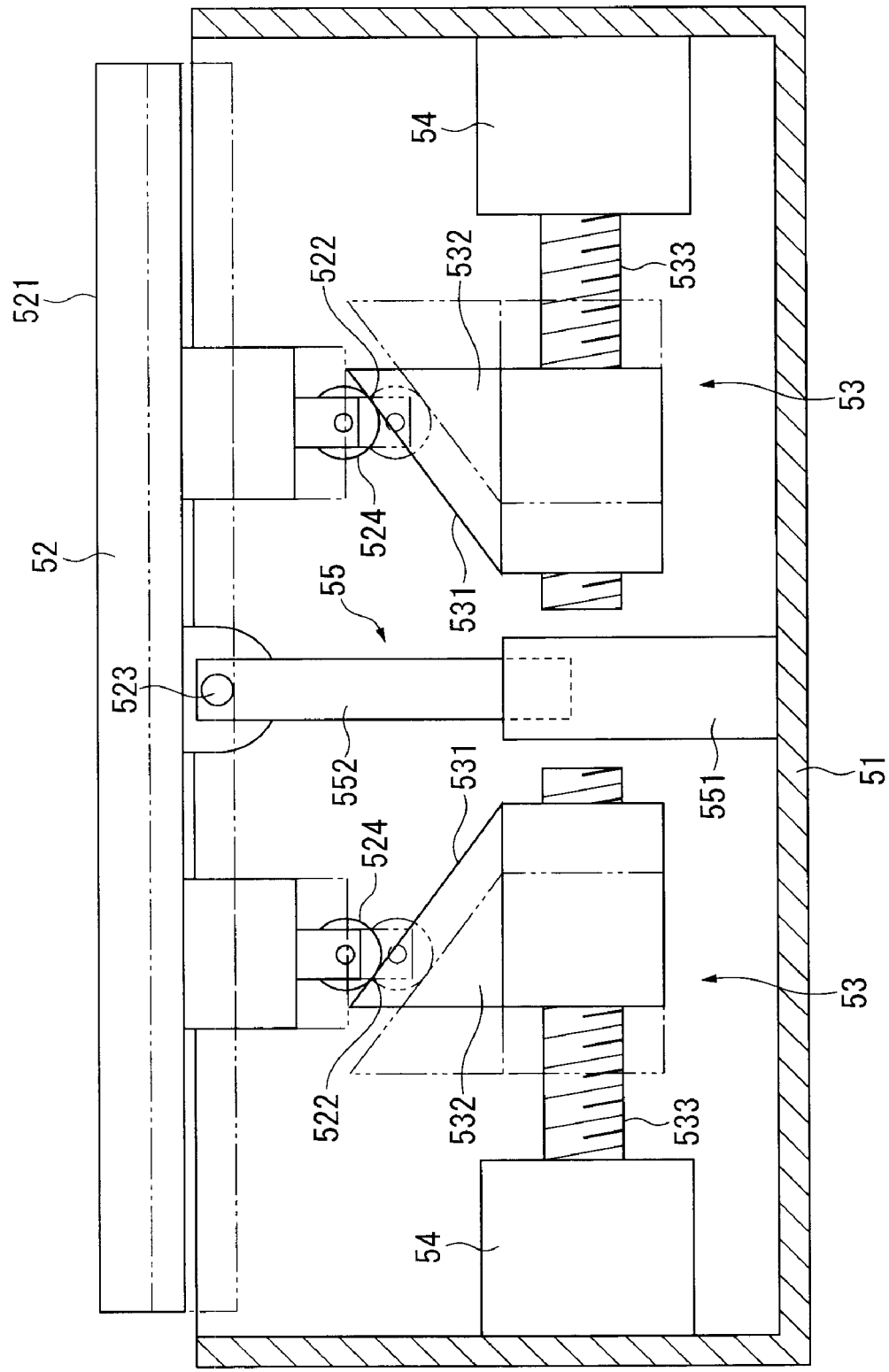
FIG. 5 is a lateral view for explaining elevation-position adjustment of the elevation inclination adjuster.

According to such a configuration, as shown in FIG. 5, when the pair of moving units 53 move the points of action 522 in the same direction by the same amount, the placement surface 521 is parallely moved, so that the elevation position of the non-illustrated measuring device placed on the placement surface 521 (placed object) can be adjusted. In other words, the table 52 can be vertically moved (auto-set) along the L-axis direction orthogonal to the horizontal plane. Herein, "auto-set" means a function for adjusting the relative positions of the detector 42 and the workpiece W.

Figure 6:
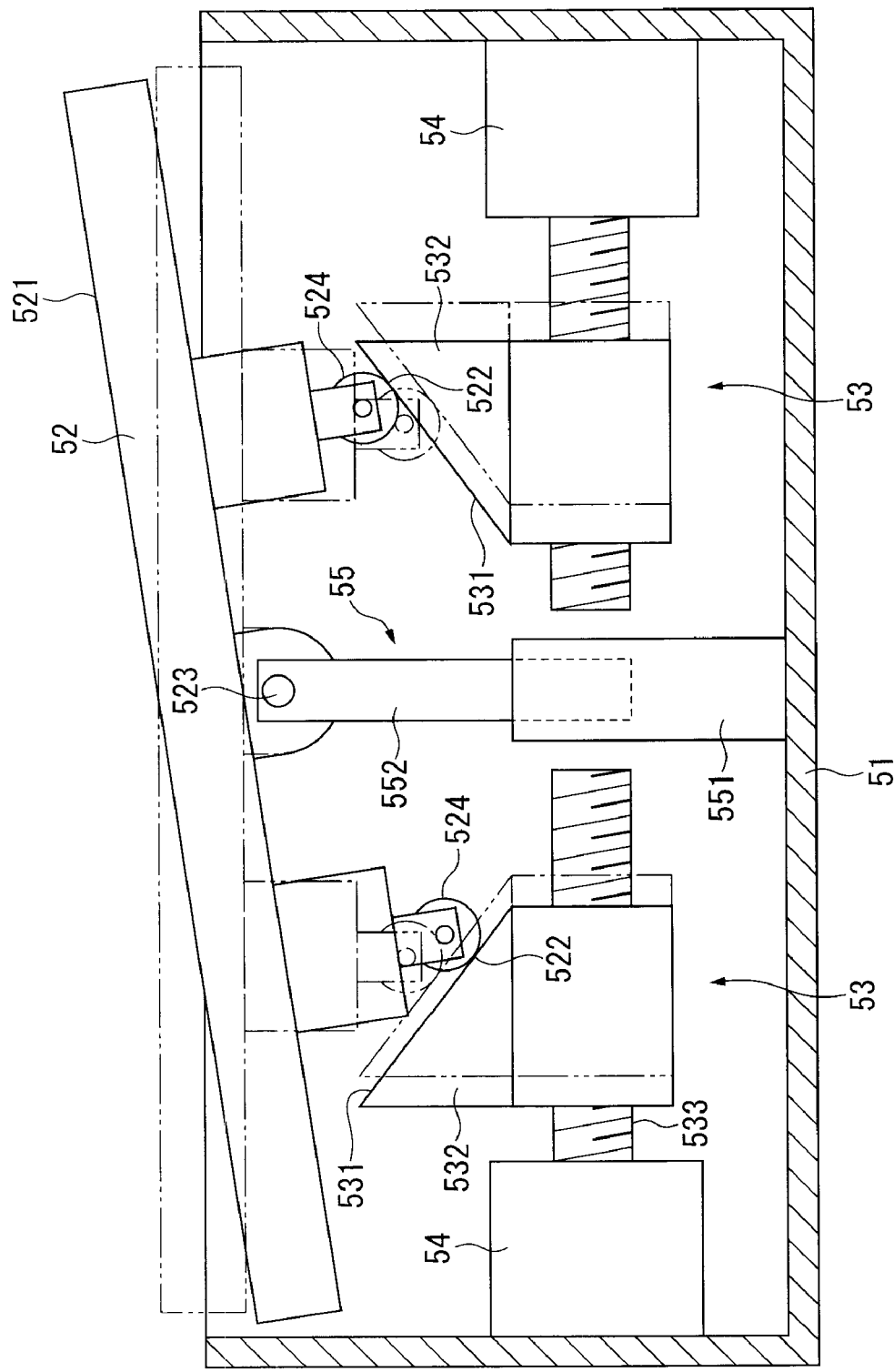
FIG. 6 is a lateral view for explaining inclination-angle adjustment of the elevation inclination adjuster.

Further, as shown in FIG. 6, when the pair of moving units 53 move either one of the points of action 522, the placement surface 521 is swung around the fulcrum 523, so that the inclination angle of the measuring device placed on the placement surface 521 is adjusted. In other words, the table 52 can be moved to be inclined (auto-leveling) around the R axis orthogonal to the L axis and parallel to the horizontal plane. Herein, "auto-leveling" means a function for adjusting an inclination angle of the detector 42 or the workpiece W so that the measurement direction of the detector 42 becomes parallel to the measurement target surface of the workpiece W.

In the automatic inclination step S6 in the flow shown in FIG. 3, after the computing unit obtains the inclination angle at which the surface of the measurement target portion is inclined to the measurement direction of the detector 42 (FIG. 2), the computing unit may obtain the relative height of the points of action 522 at two positions corresponding to the obtained inclination angle, and output to-be-adjusted movement amounts of the moving units 53 to the positioning controller 64 (FIG. 2) as a control signal. In the above manner, the positioning controller 64 can incline the table 52 by moving the moving units 53 by the respective predetermined amounts, and can control the measurement direction of the detector 42 to be parallel to the surface of the measurement target portion.

[Advantages of Exemplary Embodiment]

This exemplary embodiment provides the following exemplary advantages.

(1) Since the elevation inclination adjuster 5 capable of adjusting the elevation position and the inclination angle of the table 52 is included, the elevation movement and the inclination movement of the measuring device 4 can be performed by a single device when a preliminary measurement and a main measurement are conducted. Thus, the positioning of the workpiece W can be performed with a compact configuration. Further, merely by controlling the elevation inclination adjuster 5, the positioning controller 64 can perform the positioning of the workpiece W based on the inclination angle obtained by the computing unit 65. Thus, automation of the positioning can be facilitated and operability of the positioning can be enhanced.

(2) Since the surface texture measuring instrument 1 includes the workpiece feeder 7 and performs the inputting and outputting of the control signals such as measurement start/stop signals and status signals between the external controller 9 and the controller 6, an automatic inspection system can be easily constructed. Examples of such a system include: a system for remotely administering operations of the surface texture measurement through the external controller 9; and a system for automatically performing a sorting of products (i.e., workpiece W) into non-defective products and defective products and assortment thereof by making a pass-fail decision based on the measurement result through the external controller 9. Such systems can be easily constructed. In other words, a step for measuring surface texture can be easily incorporated into a manufacturing line and an inspection line.

(3) By driving either one of the pair of moving units 53 or both thereof, both the elevation position and the inclination angle of the measuring device 4 can be adjusted with a compact configuration. Thus, the positioning of the workpiece W in the surface texture measuring instrument 1 can be performed.

(4) Since the driving sources 54 drive the pair of moving units 53, it is possible to enhance operability of adjustments that have been hitherto manually conducted.

(5) The fulcrum guide 55 linearly guides the fulcrum 523 (inclination rotation center) along the L-axis direction and the fulcrum 523 does not move in the horizontal direction. Thus, the accuracy when the inclination angle of the table 52 is adjusted based on the fulcrum 523 can be increased.

(6) Since the sliders 532 are only required to be horizontally moved, the entire device can be downsized in terms of height dimension as compared with a configuration where the sliders 532 are vertically moved.

(7) Since the point-of-action member is the roller 524 and the roller 524 rolls on the slanted surface 531 when the roller 524 is moved, wear of a contact portion between the roller 524 and the slanted surface 531 can be minimized.

[Second Exemplary Embodiment]

Next, an elevation inclination adjuster 5A according to a second exemplary embodiment of the invention will be described with reference to FIG. 7.

Figure 7:
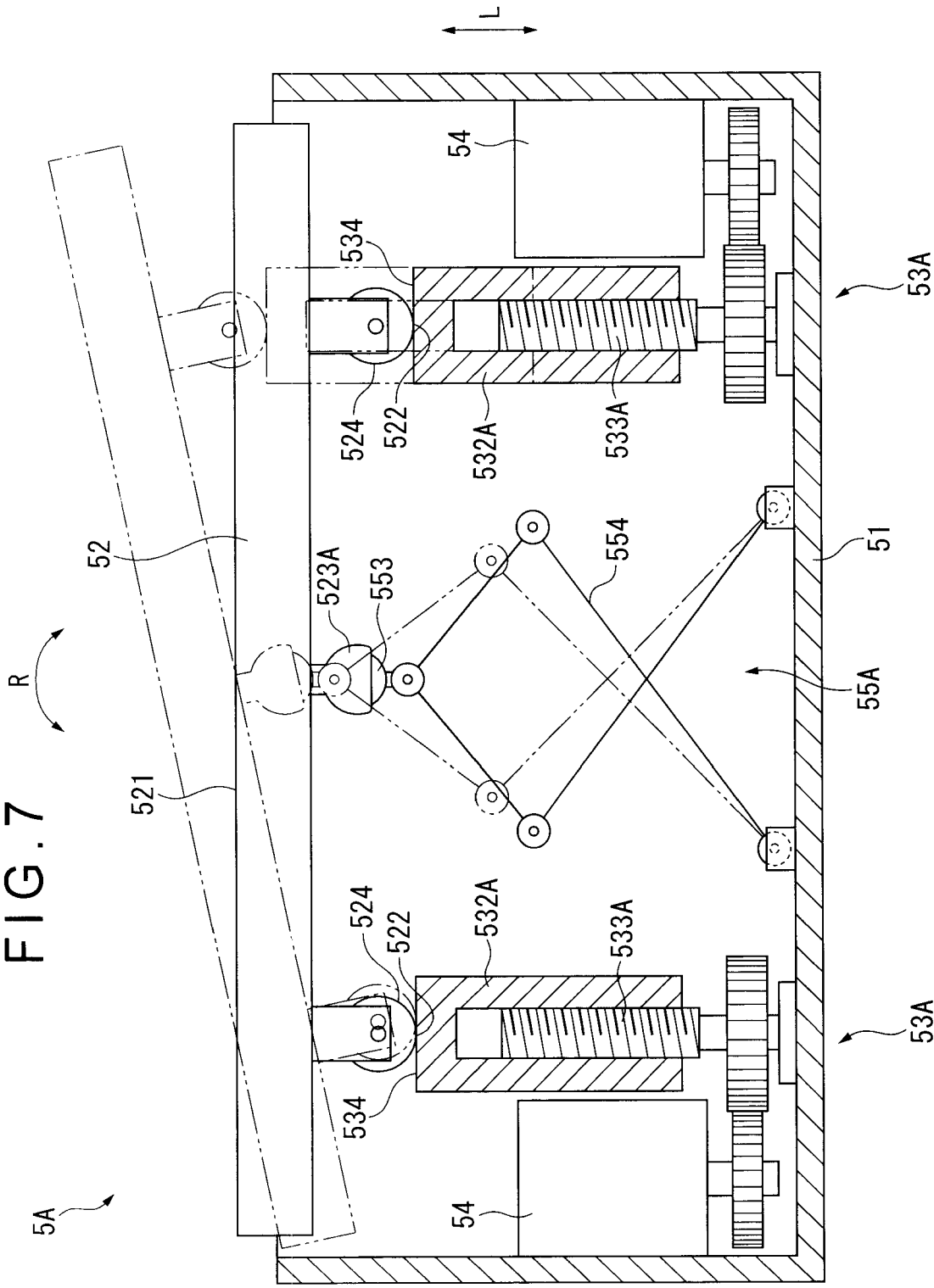
FIG. 7 is a lateral view schematically showing a driving mechanism for an elevation inclination adjuster according to a second exemplary embodiment of the invention.

FIG. 7 is a lateral view schematically showing a driving mechanism for the elevation inclination adjuster 5A. The elevation inclination adjuster 5A is different from the above elevation inclination adjuster 5 according to the first exemplary embodiment in configurations of moving units 53A and guide fulcrum 55A. The other structures are substantially the same.

Specifically, the moving units 53A each include: a slider 532A having a horizontal opposed surface 534 opposed to the table 52; and a lead screw 533A (slider moving member) connected to the driving source 54 for moving the slider 532A in the L-axis direction.

More specifically, the driving source 54 and the lead screw 533A are supported on the base 51 such that their rotation axes vertically extend. The rotational driving force of the driving source 54 is transmitted to the lead screw 533A via gears. The slider 532A screwed to the lead screw 533A is moved in the L-axis direction by the rotation of the lead screw 533A.

Further, the table 52 is provided with the rollers 524 (point-of-action member) that are in contact with the opposed surfaces 534. The opposed surfaces 534 and contact portions of the rollers 524 provide the points of action 522.

The fulcrum guide 55A includes: a linkage member 553 provided to be swingable around the fulcrum 523A of the table 52; and a pantograph mechanism 554 provided to the base 51 for linearly guiding the linkage member 553 along the L-axis direction. With use of the fulcrum guide 55A, the fulcrum 523A can be linearly guided in the L-axis direction without restraining the movement of the fulcrum 523A in the elevation direction.

According to such a configuration, when the placement surface 521 is parallely moved, the points of action 522 are moved in the L-axis direction without moving along the opposed surface 534.

In addition, when the placement surface 521 is swung around the fulcrum 523A, the points of action 522 are moved in the L-axis direction while moving along the opposed surface 534.

Figure 8:
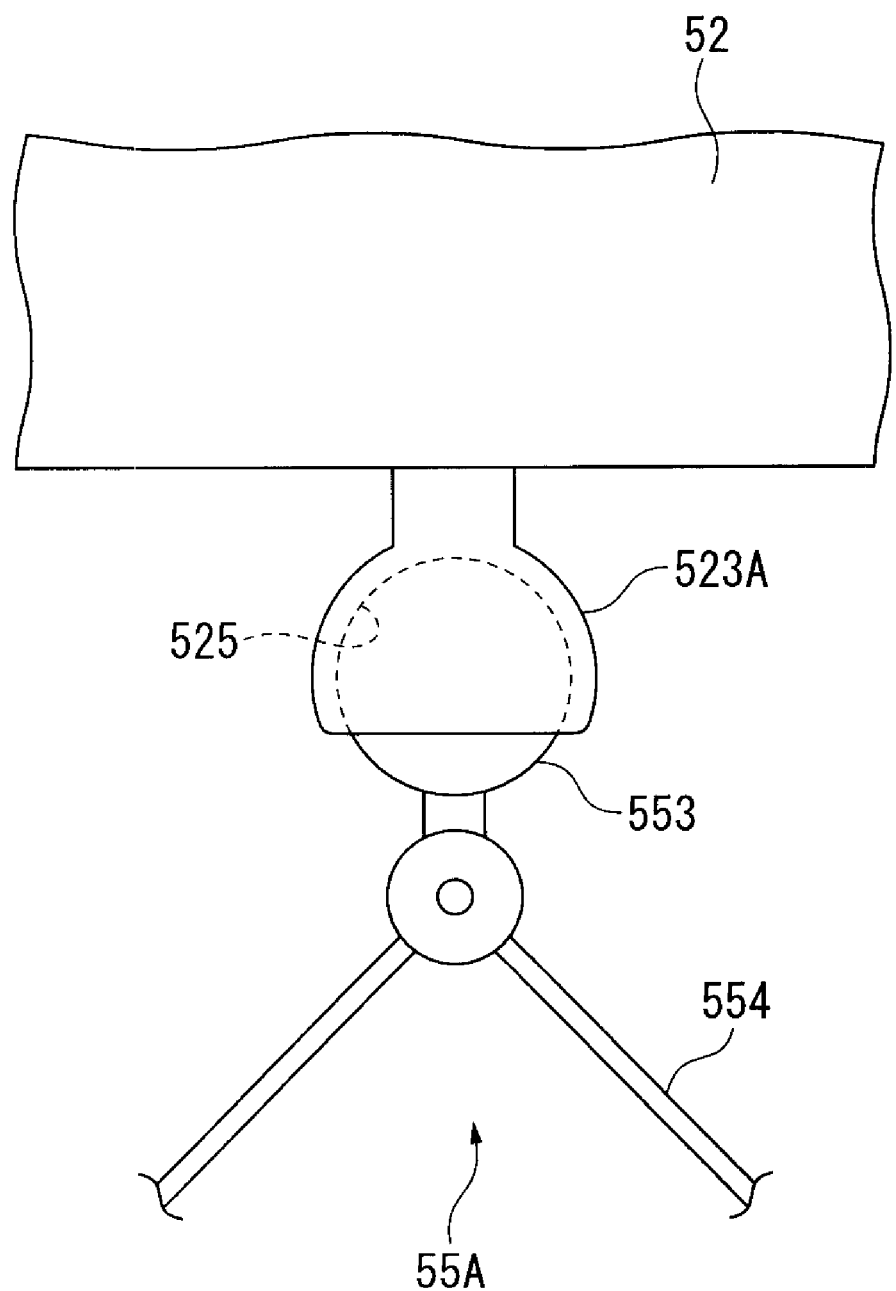
FIG. 8 is a lateral view partially showing a fulcrum guide of the elevation inclination adjuster.

A linkage structure of the fulcrum 523A and the linkage member 553 will be described below with reference to FIG. 8.

The fulcrum 523A, which is provided on a lower surface of the table 52, internally includes a substantially spherical accommodating portion 525. The substantially spherical accommodating portion 525 is downwardly open. The center position of the substantially spherical accommodating portion 525 serves substantially as a fulcrum.

The linkage member 553 includes a spherical portion accommodated in the substantially spherical accommodating portion 525 of the fulcrum 523A, and jointed thereto to be rotatable around its shaft in two directions relative to the fulcrum 523A.

Figure 9:
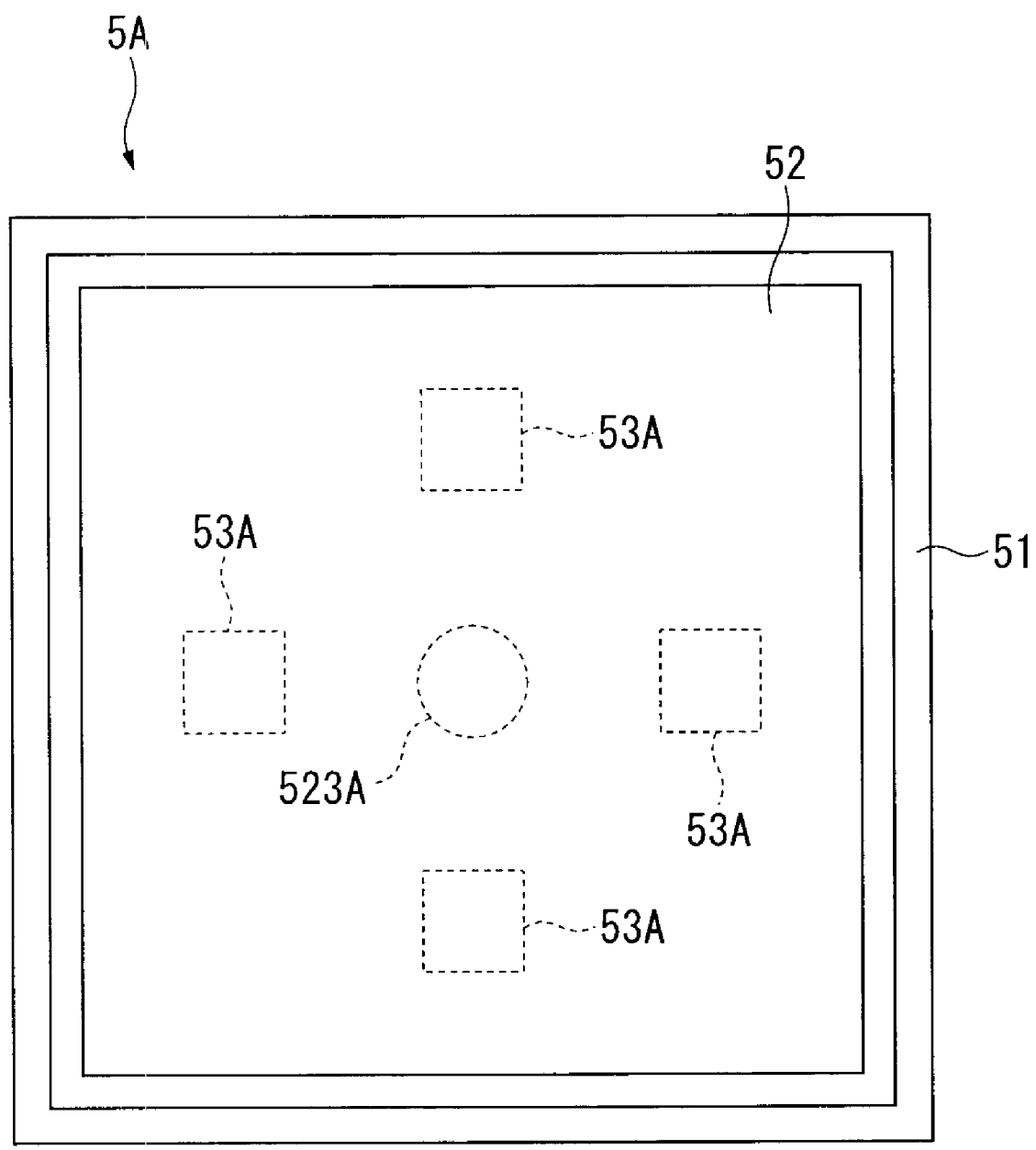
FIG. 9 is a plan view showing the elevation inclination adjuster.

As shown in FIG. 9, the elevation inclination adjuster 5A with such a linkage structure includes four moving units 53A of which one pair are arranged in one direction while the other pair are arranged in a direction orthogonal thereto in plan view. With this configuration, the table 52 can be inclined around the fulcrum 523A in two directions. Further, by combining a Y-axis table for moving the workpiece W in the Y-axis direction, auto-leveling of the measurement target surface, which is required for a three-dimensional surface roughness measurement, can be conducted.

This exemplary embodiment can provide the following exemplary advantages in addition to substantially the same advantages as the above-described ones.

(8) The fulcrum guide 55A linearly guides the fulcrum 523A along the L-axis direction and the fulcrum 523 does not move in the horizontal direction. Thus, the accuracy when the inclination angle of the table 52 is adjusted based on the fulcrum 523 can be increased. In addition, the use of the pantograph mechanism 554 can contribute to weight reduction of the fulcrum guide 55A.

(9) Since the opposed surface 534 is substantially horizontally provided to be orthogonal to the L axis, a load of the measuring device (not shown) to be placed on the placement surface 521 is applied in a direction orthogonal to the opposed surface 534 via the rollers 524. Thus, the support of the table 52 by the moving units 53A can be stabilized.

(10) Since the point-of-action member is the roller 524 and the roller 524 rolls on the opposed surface 534 when the roller 524 is moved, wear of a contact portion between the roller 524 and the opposed surface 534 can be minimized.

[Third Exemplary Embodiment]

Next, an elevation inclination adjuster 5B according to a third exemplary embodiment of the invention will be described with reference to FIG. 10.

FIG. 10 is a lateral view schematically showing a driving mechanism for the elevation inclination adjuster 5B. The elevation inclination adjuster 5B is different from the elevation inclination adjusters of the above exemplary embodiments in that the fulcrum 523B coincides with either one of the points of action at two positions. The other structures are substantially the same.

Either one of the pair of moving units 56, 57 supports the point of action 522, and also serves as a point-of-action moving unit 56 for moving the point of action 522 in a direction in which the distance between the point of action 522 and the base 51 is increased or decreased (i.e., distance increasing/decreasing direction).

On the other hand, the other one of the pair of moving units 56, 57 supports the fulcrum 523B, and also serves as a fulcrum moving unit 57 for moving the fulcrum 523B in a direction in which the distance between the fulcrum 523B and the base 51 is increased or decreased (i.e., distance increasing/decreasing direction).

Specifically, the point-of-action moving unit 56 include: a point-of-action slider 562 having an opposed surface 564 opposed to the table 52; a lead screw 563 (point-of-action-slider moving member) connected to the driving source 54 for moving the point-of-action slider 562 in the L-axis direction of the placement surface 521; and a linear-movement guide 565 for linearly guiding the point-of-action slider 562.

On the other hand, the fulcrum moving unit 57 include: a fulcrum slider 572 for pivotally supporting the fulcrum 523B of the table 52 by a bearing; a lead screw 573 (fulcrum-slider moving member) connected to the driving source 54 for moving the fulcrum slider 572 in the L-axis direction; and a linear-movement guide 575 for linearly guiding the fulcrum slider 572.

Further, the table 52 is provided with the roller 524 (point-of-action member) that is in contact with the opposed surface 564. The opposed surface 564 and contact portion of the roller 524 provide the point of action 522. The roller 524, which rolls on the opposed surface 564, is supported in a manner movable on the opposed surface 564.

When the placement surface 521 is parallely moved, the point of action 522 is moved in the distance increasing/decreasing direction without moving along the opposed surface 522.

In addition, when the placement surface 521 is swung around the fulcrum 523B, the point of action 522 is moved in the distance increasing/decreasing direction while moving along the opposed surface 564.

The driving sources 54, which are DC servomotors with encoders, are capable of detecting relative positions of the sliders 562 and 572. In this configuration, the current positions of the sliders 562 and 572 need to be recognized when the elevation inclination adjuster 5B is switched on. Accordingly, the linear-movement guides 565 and 575 are provided with photosensors 566 and 576 (position detector) for detecting the original positions of the sliders 562 and 572. When the sliders 562 and 572 are moved to the original positions, the photosensors 566 and 576 detect the sliders 562 and 572.

When the linear-movement guides 565 and 575 are provided with linear encoders capable of detecting absolute positions of the sliders 562 and 572, the above-described detection of the original positions can be skipped.

In this exemplary embodiment, the rotational driving force of the driving sources is transmitted to the lead screws by timing belts. However, the transmission mechanism is not limited to a belt-driven mechanism but may be a mechanism driven by worms and worm wheels. For instance, the driving sources may be located so that their rotational shafts horizontally extend, and the driving sources may rotate the worms to transmit the rotational force to the worm wheels provided at lower ends of the lead screws. With this arrangement, the rotational shafts of the driving sources can be horizontally located, thereby reducing the height of the entire device.

This exemplary embodiment can provide the following exemplary advantage in addition to substantially the same advantages as the above-described ones.

(11) Since the fulcrum 523B coincides with either one of the points of action at two positions, the fulcrum guide is not required, thereby contributing to reduction in the number of components.

It should be understood that the invention is not limited to the above-described exemplary embodiment(s) but includes modifications and improvements as long as such modifications and improvements are compatible with the invention.

What is claimed is:

1. A surface texture measuring instrument, comprising:
a measuring device that comprises a detector that detects surface texture of a workpiece; and a movement mechanism that guides the detector movably in a measurement direction;
an elevation inclination adjuster that comprises a table on which either one of the workpiece and the measuring device is mounted, the elevation inclination adjuster being capable of adjusting an elevation position and an inclination angle of the table;
a stage on which the other one of the workpiece and the measuring device is mounted; and
a controller that controls the measuring device and the elevation inclination adjuster, wherein
the elevation adjuster comprises:
a base;
a table having a placement surface, two points of action in a direction parallel to the placement surface and a fulcrum provided between the two points of action;
a pair of moving units that support the points of action of the table and move the points of action in a direction in which the distance between the points of action and the base is increased or decreased; and,
a fulcrum guide that supports the fulcrum between the pair of moving units and guides the table in a direction orthogonal to the placement surface; and,
the controller comprises:
a measurement controller that controls the movement mechanism to conduct a preliminary measurement and a main measurement of the workpiece;
a computing unit that acquires a result of the preliminary measurement from the detector and obtains an inclination angle of the workpiece at which the workpiece is inclined to the measurement direction; and
a positioning controller that controls the elevation inclination adjuster to adjust the elevation position of the table and adjust the inclination angle of the table based on the inclination angle obtained by the computing unit.

2. The surface texture measuring instrument according to claim 1, further comprising:
an external device worked in conjunction with the measuring device; and
an external controller that controls the external device and performs inputting and outputting of control signals between the controller and the external controller.

3. A method of measuring surface texture of a workpiece with use of a surface texture measuring instrument, the surface texture measuring instrument comprising: a measuring device that comprises: a detector that detects the surface texture of the workpiece; and a movement mechanism that guides the detector movably in a measurement direction; an elevation inclination adjuster that comprises a table on which either one of the workpiece and the measuring device is mounted, the elevation inclination adjuster being capable of adjusting an elevation position and an inclination angle of the table; a stage on which the other one of the workpiece and the measuring device is mounted; and a controller that controls the measuring device and the elevation inclination adjuster, the elevation inclination adjuster comprising:
a base;
a table having a placement surface, two points of action in a direction parallel to the placement surface and a fulcrum provided between the two points of action;
a pair of moving units that support the points of action of the table and move the points of action in a direction in which the distance between the points of action and the base is increased or decreased; and,
a fulcrum guide that supports the fulcrum between the pair of moving units and guides the table in a direction orthogonal to the placement surface;
the method comprising:
first auto-setting to operate the elevation inclination adjuster to elevate or lower the table to a position where the detector is capable of detecting the workpiece;
preliminary measuring to drive the movement mechanism to move the detector in the measurement direction to scan the workpiece;
automatically separating to operate the elevation inclination adjuster to automatically move the detector away from the workpiece by elevation of the table;
automatically inclining to operate the elevation inclination adjuster to adjust the inclination angle of the table based on an inclination angle of the workpiece obtained from a result of the preliminary measuring, the inclination angle of the workpiece being an angle at which the workpiece is inclined to the measurement direction;

second auto-setting, after said table is inclined by operation of said elevation inclination adjuster, to operate the elevation inclination adjuster to elevate or lower the inclined table to a position where the detector is capable of detecting the workpiece; and main measuring to drive the movement mechanism to move the detector in the measurement direction to scan the workpiece.

* * * * *